United States Patent
Robert et al.

(10) Patent No.: US 10,131,477 B2
(45) Date of Patent: Nov. 20, 2018

(54) CONTAINER TOP WITH REMOVABLE SEAL

(71) Applicants: Stephen Robert, Toronto (CA);
William Traynor, Mississauga (CA)

(72) Inventors: Stephen Robert, Toronto (CA);
William Traynor, Mississauga (CA)

(73) Assignees: Stephen Robert, Toronto (CA);
William Traynor, Toronto (CA)

( * ) Notice: Subject to any disclaimer, the term of this patent is extended or adjusted under 35 U.S.C. 154(b) by 148 days.

(21) Appl. No.: 14/079,619

(22) Filed: Nov. 13, 2013

(65) Prior Publication Data
US 2014/0069919 A1  Mar. 13, 2014

Related U.S. Application Data

(63) Continuation-in-part of application No. 13/903,973, filed on May 28, 2013, now Pat. No. 9,827,729.
(Continued)

(51) Int. Cl.
*B65B 7/00* (2006.01)
*B29C 47/00* (2006.01)
(Continued)

(52) U.S. Cl.
CPC ......... *B65D 51/22* (2013.01); *B29D 99/0096* (2013.01); *B29C 45/14336* (2013.01);
(Continued)

(58) Field of Classification Search
CPC . B29C 66/53; B29C 66/534; B29C 66/53421; B29C 66/5344; B29C 66/5346;
(Continued)

(56) References Cited

U.S. PATENT DOCUMENTS 4,898,293 A    2/1990  Morel
5,110,041 A *  5/1992  Keeler .................... B29C 65/02
                                              220/265
(Continued)

FOREIGN PATENT DOCUMENTS

EP    0639144    2/1995
EP    1013562    6/2000
(Continued)

OTHER PUBLICATIONS

Machine Translation of FR2889481 to Malsch, 11 pages.

*Primary Examiner* — Philip C Tucker
*Assistant Examiner* — Brian R Slawski
(74) *Attorney, Agent, or Firm* — Ridout & Maybee LLP

(57) ABSTRACT

A molded article comprising a container top is disclosed. The molded article includes a threadless frame defining an opening, a flip cap located substantially coplanar with, and integrally formed with, the frame, a compound hinge between the frame and the flip cap, the hinge allowing the flip cap to rotate about the hinge to rest on top of the frame, an in-mold lidding film having a perimeter molded to the frame such that the in-mold lidding film covers the opening defined by the frame, wherein the in-mold lidding film is removable from the frame, and a pull tab, formed from the in-mold lidding film, that extends past the opening defined by the frame.

19 Claims, 12 Drawing Sheets

Related U.S. Application Data

(60) Provisional application No. 61/725,519, filed on Nov. 13, 2012, provisional application No. 61/651,660, filed on May 25, 2012.

(51) Int. Cl.

| | |
|---|---|
| *B29C 65/00* | (2006.01) |
| *B32B 37/00* | (2006.01) |
| *C08J 5/00* | (2006.01) |
| *B65D 51/20* | (2006.01) |
| *B65D 43/18* | (2006.01) |
| *B65D 17/34* | (2006.01) |
| *B65D 41/00* | (2006.01) |
| *B65D 39/00* | (2006.01) |
| *B65D 43/00* | (2006.01) |
| *B65D 47/00* | (2006.01) |
| *B65D 51/00* | (2006.01) |
| *B65D 51/22* | (2006.01) |
| *B29D 99/00* | (2010.01) |
| *B29C 45/14* | (2006.01) |
| *B29C 65/76* | (2006.01) |
| *B29C 65/48* | (2006.01) |
| *B29C 65/70* | (2006.01) |

(52) U.S. Cl.
CPC .......... *B29C 65/4815* (2013.01); *B29C 65/70* (2013.01); *B29C 65/76* (2013.01); *B29C 66/53461* (2013.01); *B29C 2045/1477* (2013.01); *B29C 2045/14319* (2013.01); *B29C 2045/14909* (2013.01); *B29C 2045/14918* (2013.01)

(58) Field of Classification Search
CPC ............ B29C 66/53461; B29C 66/536; B29C 66/1122; B29C 66/43; B29C 65/02; B29C 65/18; B29C 65/40; B29C 65/48; B29C 65/4815; B29C 65/70; B29C 2045/14319; B29C 2045/1477; B29C 2045/14909; B29C 2045/14918; B29C 45/14336; B29C 65/76; B65D 17/16; B65D 17/161; B65D 17/163; B65D 17/50; B65D 17/501; B65D 2517/0013; B65D 2517/5083; B65D 51/18; B65D 51/20; B65D 51/22; B29D 99/0096

USPC ... 156/60, 69, 108, 228, 242, 245, 246, 247, 156/277, 285, 286, 290, 292, 293, 303.1, 156/308.2, 308.4, 309.6; 220/200, 212, 220/258.1, 258.2, 259.1, 359.1, 359.2, 220/359.4; 264/129, 132, 239, 241, 250, 264/259, 267, 268, 299, 319, 328.1, 330, 264/331.11

See application file for complete search history.

(56) References Cited

U.S. PATENT DOCUMENTS

| | | | |
|---|---|---|---|
| 5,711,453 A | | 1/1998 | Weiler |
| 5,725,121 A | * | 3/1998 | Gianpaolo ............ B65D 5/746 |
| | | | 215/306 |
| 5,810,197 A | | 9/1998 | Mazzarolo |
| 5,934,496 A | * | 8/1999 | Mogard ................ B65B 7/2878 |
| | | | 215/235 |
| 6,076,704 A | | 6/2000 | Weiler |
| 6,375,067 B1 | * | 4/2002 | Moriyama ............ B65D 5/749 |
| | | | 220/359.2 |
| 6,863,212 B2 | | 3/2005 | Stone |
| 8,443,998 B2 | | 5/2013 | Domoy |
| 2001/0015356 A1 | * | 8/2001 | Jud ........................ B65D 77/20 |
| | | | 220/359.1 |
| 2002/0060220 A1 | * | 5/2002 | Torniainen ........... B65D 51/246 |
| | | | 220/212 |
| 2005/0236415 A1 | | 10/2005 | Ozasa |
| 2006/0151415 A1 | * | 7/2006 | Smelko ............... B65D 77/2032 |
| | | | 215/232 |
| 2012/0055981 A1 | | 3/2012 | Parks |
| 2012/0091163 A1 | | 4/2012 | Lowry |
| 2013/0175284 A1 | | 6/2013 | Chen |

FOREIGN PATENT DOCUMENTS

| | | | | |
|---|---|---|---|---|
| EP | 1157936 | | 11/2001 | |
| FR | 2889481 A1 | * | 2/2007 | ....... B29C 45/14311 |
| WO | 2005018312 | | 3/2005 | |

\* cited by examiner

CONTAINER TOP WITH REMOVABLE SEAL

CROSS-REFERENCE TO RELATED APPLICATIONS

This patent application claims priority to provisional patent application No. 61/725,519 filed Nov. 13, 2012 and entitled "Container Lid with Hinged Re-closable Access Door and Integrated Film Seal." This patent application is also a continuation in part of patent application Ser. No. 13/903,973 filed on May 28, 2013, and entitled "Food Container Top With Integrally Formed Utensil," now U.S. Pat. No. 9,827,729, which claims priority to provisional patent application No. 61/651,660 filed May 25, 2012 and entitled "Sealing Ring Lid with Integrated Eating or Other Utensil." The subject matter of patent application Ser. Nos. 61/725,519, 13/903,973 and 61/651,660 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention relates to field of manufacturing, and more particularly relates to the field of plastics manufacturing of containers.

BACKGROUND OF THE INVENTION

The plastics industry is one of the largest industries in the world, and the third largest manufacturing industry in the United States. In the U.S. alone, the plastics industry employs more than 885,000 people and creates more than $380 billion in annual revenue. One of the largest sectors of the plastics manufacturing industry is the food container manufacturing sector. Food containers comprised of plastics can take many forms, including bottles, cups, bowls, plates, jugs, boxes, etc. There is further a large variety of ways to manufacture and shape the various plastic food containers.

A common type of food container, such as a ketchup container, includes a main housing or compartment that holds the ketchup, a removable seal that covers the top of the main housing to seal in the ketchup, and a threaded top with a flip cap that is threaded on top of the seal. A wide array of foods, both solids and in liquid form, are sold using this common food container. One of the problems associated with this type of container, however, is the expense associated with manufacturing the item. The manufacturing of the aforementioned conventional food container includes a process for forming the main housing, a separate process for placing the seal on the main housing and yet another process for both manufacturing the threaded top and placing the top on the main housing. It is well known that each process undertaken during the manufacturing of a plastic product increases the time, materials, and expense associated with the manufacturing.

Another problem associated with the aforementioned conventional food container is its lack of efficiency in use. Typically, when a user purchases the aforementioned food container, such as a ketchup container, the user must unthread the top from the main housing, remove the removable seal with his hands, and then replace the threaded top onto the main housing, so that the user may utilize the ketchup container. This can be tedious and time consuming for consumers to perform. Furthermore, the aforementioned process—which is typically only performed once in the life cycle of the food container—requires threading to be present on the threaded top, as well as the main housing. Considering that the threading process is only performed once in the life cycle of the food container, the time and effort to include the threading feature in the food container can be considered wasteful.

From the foregoing, it is apparent that there exists a definite need for a container that can be manufactured in a more efficient manner and in such a way as to meet the desires of consumers.

SUMMARY OF THE INVENTION

Briefly, in accordance with one embodiment of the present invention, a method for producing a container top, and a container including a top are disclosed. The method includes providing a mold for forming a molded article, wherein the mold defines a threadless frame, a flip cap located substantially coplanar with the frame and a hinge between the frame and the flip cap, and providing an in-mold lidding film having a heat activatable lower surface. The method further includes positioning the in-mold lidding film adjacent to an interior molding surface of the mold, and molding the molded article from a heated thermoplastic resin contained within the mold, whereby the heated thermoplastic resin contacts a perimeter of the heat-activatable lower surface of the in-mold lidding film, and the perimeter of the heat-activatable lower surface of the in-mold lidding film is molded to the frame of the article such that the in-mold lidding film hermetically seals an opening defined by the frame. The method further includes cooling the molded article, removing the molded article from the mold, and hingeably rotating the flip cap about the hinge such that the flip cap rests on top of the frame. The method may further include hermetically sealing a bottom surface of the frame of the molded article to a top surface of a compartment, so as to cover an opening in the compartment.

In another embodiment, a molded article comprising a container top is disclosed. The molded article includes a threadless frame defining an opening, a flip cap located substantially coplanar with, and integrally formed with, the frame, a compound hinge between the frame and the flip cap, the hinge allowing the flip cap to rotate about the hinge to rest on top of the frame, an in-mold lidding film having a perimeter molded to the frame such that the in-mold lidding film covers the opening defined by the frame, wherein the in-mold lidding film is removable from the frame, and a pull tab, formed from the in-mold lidding film, that extends past the opening defined by the frame.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

Figure 1:
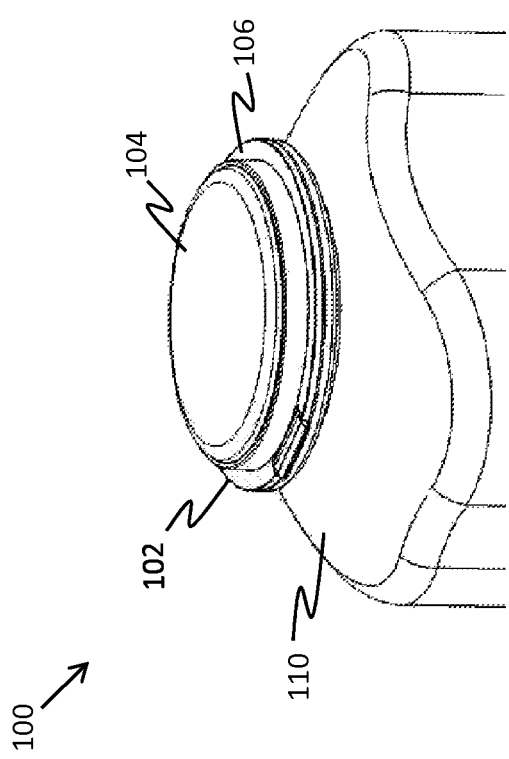
FIG. 1 is an illustration of a perspective view of a food container including a top having a removable seal, wherein the top is in the closed position, in accordance with one embodiment.

The disclosed embodiments overcome problems with the prior art by providing a simple and user-friendly plastic container including a top with a removable seal and a flip cap, as well as an efficient mold-manufacturing method for forming the same. The disclosed embodiments further solve problems with the prior art by providing a container top that does not require a top to be removed before a hermetic seal is removed—rather it provides a top with a hermetic seal that can be peeled away, while allowing the top to remain in place. The disclosed embodiments also solve problems with the prior art by providing a mold-manufacturing method that molds the top and the hermetic seal in one step, using in-mold labeling processes. The disclosed embodiments further solve problems with the prior art by providing a mold-manufacturing method that only requires one process or pass to add said top to the final food container product. This reduction in processes or passes decreases the time, materials, and expense associated with the manufacturing of said food containers. Lastly, the disclosed embodiments rely on hermetic sealing technology, such as ultrasonic welding, to attach the top to the food container, thereby eliminating the need for threads on the top, and further eliminating the requirement that the top is circular or cylindrical to accommodate threads.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing, like numerals refer to like parts through several views.

Figure 2:
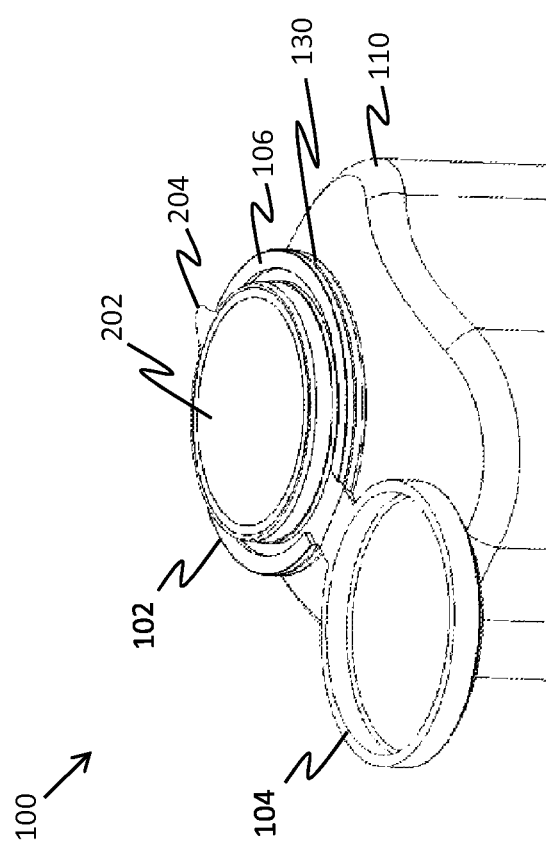
FIG. 2 is an illustration of a perspective view of the food container of FIG. 1, wherein the top is in the open position, in accordance with one embodiment.

FIG. 1 is an illustration of a perspective view of a food container 100 including a top 102 having a removable seal, wherein the top 102 is in the closed position, and FIG. 2 is an illustration of a perspective view of the food container 100 of FIG. 1, wherein the top 102 is in the open position. The food container 100 includes a compartment 110 comprising an element, such as a main housing, having a volume that holds the food included in the food container 100. The top 102 comprises a frame or ring 106, and a flip cap 104 that is hingeably connected to the ring 106, such that the flip cap 104 may rotate about the hinge connection to rest on top of the ring 106, when in the closed position, or rotate about the hinge connection away from the ring 106, when in the open position. The frame or ring 106 of the top 102 is attached to an upper brim 130 of the compartment 110, and the removable seal 202 is applied to the opening defined by the ring 106, so as to completely cover the opening, and hermetically seal the food contents of the compartment 110.

FIG. 2 shows that the seal 202 includes a protruding portion or pull tab 204 that provides a finger grip for the consumer to remove or peel the seal 202 from the frame or ring 106. The consumer can grip the pull tab 204 with his fingers and, using regular finger/hand strength, peel back the removable seal 202 and expose the contents of the volume defined by the compartment 110, including the food contents of the food container 100. Once the seal 202 is removed, the consumer may eat the food contents of compartment 110.

The frame or ring 106 of top 102 is threadless, in that the frame or ring 106 does not include any threads (either on its interior surface or exterior surfaces) for screwing the top 102 onto the compartment 110. Furthermore, the upper brim 130 of the compartment 110 is also threadless. It should be noted that although the present invention discloses a frame shown as a ring 106 having a circular shape, the present invention supports a frame of any shape, including rectangular, triangular, semi-circular, any parallelogram, irregular, or any combination of the above. Because the disclosed embodiments rely on hermetic sealing technology, such as ultrasonic welding, to attach the top 102 to the compartment 110, there is no need for threads on the top 102 or the compartment 110, and therefore, there is no requirement that the top 102 is circular or cylindrical to accommodate threads. Thus, the elimination of threads in the disclosed embodiments allows for the use of shapes other than rounded or cylindrical for the frame or ring 106.

Further, in a preferred embodiment, the removable seal 202 is an in-mold lidding film comprising at least one of a metal foil, plastic, polyolefin, polyacrylate, polystyrene, polyamide, polyvinyl alcohol, poly(alkylene acrylate), poly (ethylene vinyl alcohol), poly(alkylene vinyl acetate), polyurethane, polyacrylonitrile, polyester, fluoropolymer, polycarbonate, or combinations thereof. In one embodiment, the removable seal 202, or a portion thereof, may comprise an upper surface that is ink-printable, i.e., the upper surface allows for ink printing on its surface. In another embodiment, the removable seal 202, or a portion thereof, may be opaque, transparent, semi-transparent, or translucent. The removable seal 202 may further comprise a flexible membrane that possesses elastic characteristics.

Also in a preferred embodiment, the top 102 and brim 130 is composed of at least one of a thermoplastic, a thermosetting polymer, polyethylene, polypropylene, polystyrene, polyvinyl chloride, polytetrafluoroethylene (PTFE), polystyrene, polyvinyl chloride, nylon, polyester, polyethylene terephthalate, high density polyethylene, polyvinylidene chloride, high impact polystyrene, or mixtures thereof. The top 102 and brim 130 may further be composed of any moldable plastic, ABS plastic, injection grade plastic, bioplastic or biodegradable plastic.

Figure 3:
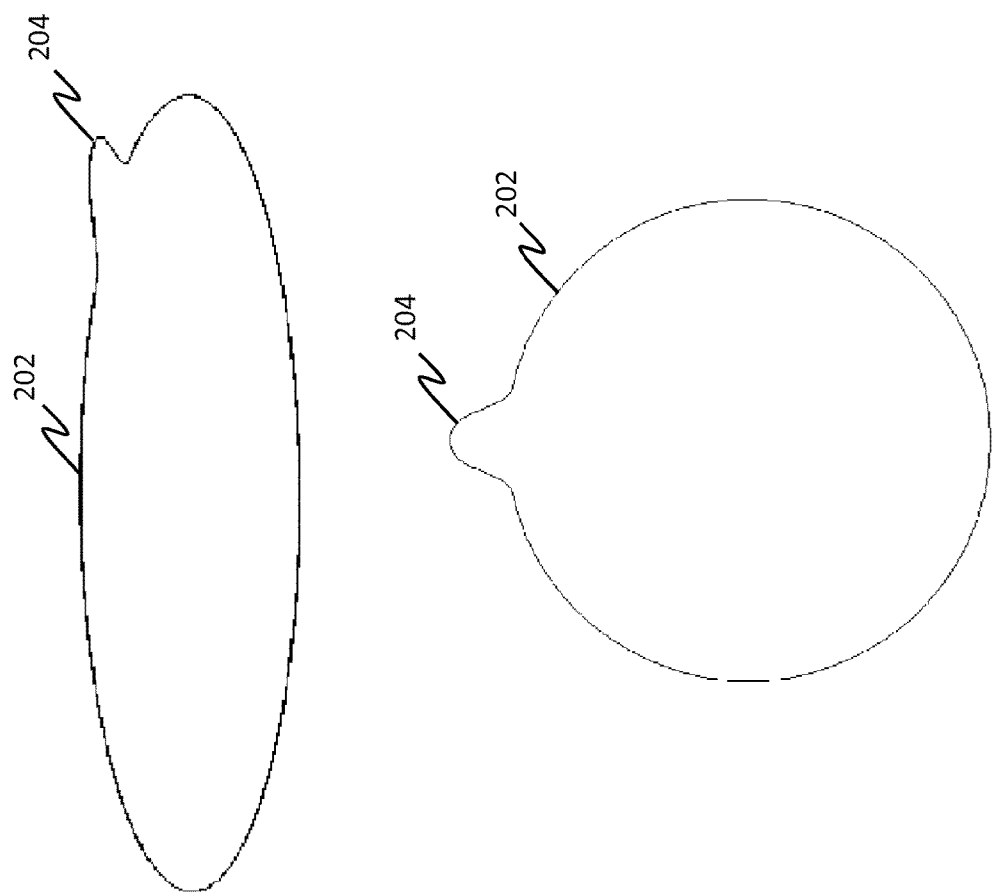
FIG. 3 is an illustration of various views of the removable seal of FIG. 1, in accordance with one embodiment.
Figure 4:
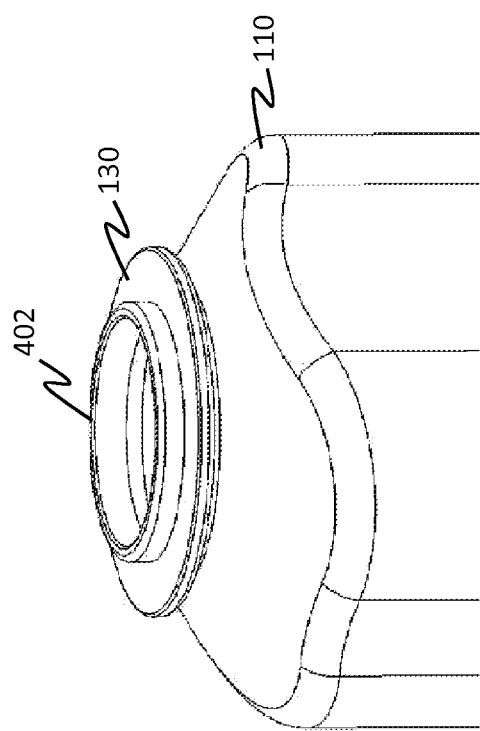
FIG. 4 is an illustration of a perspective view of the food container of FIG. 1, before the top has been assembled onto the food container, in accordance with one embodiment.

FIG. 3 is an illustration of various views of the removable seal 202 of FIG. 1, in accordance with one embodiment. FIG. 3 shows that the seal 202 forms a protruding portion or pull tab 204 that provides a finger grip for the consumer to remove or peel the seal 202 using regular finger or hand strength. FIG. 4 is an illustration of a perspective view of the food container 100 of FIG. 1, before the top 102 has been assembled onto the food container 100, in accordance with one embodiment. FIG. 4 shows an exposed an upper brim 130 of the compartment 110, including a raised ring 402 that spans the circumference of an opening in the container 110.

Figure 5:
FIG. 5 is an illustration of a detailed perspective view of the food container top of FIG. 1, wherein the top is in the closed position, in accordance with one embodiment.
Figure 6:
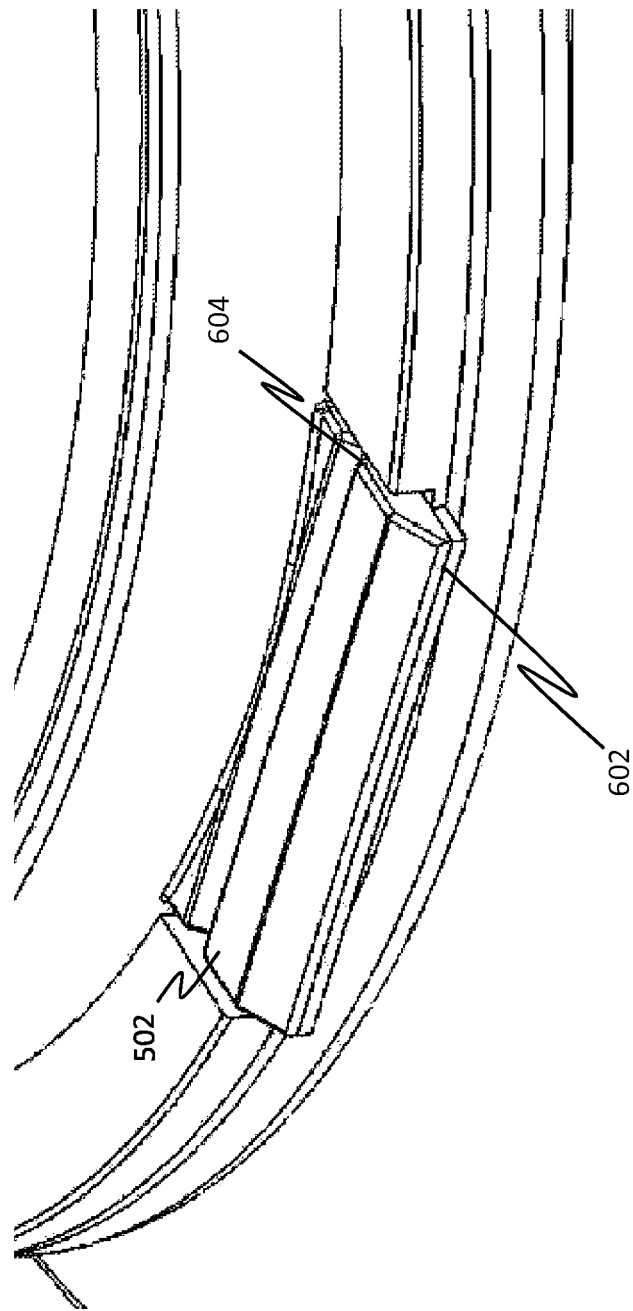
FIG. 6 is an illustration of a detailed perspective view of the compound hinge of the food container top of FIG. 1, wherein the top is in the closed position, in accordance with one embodiment.
Figure 7:
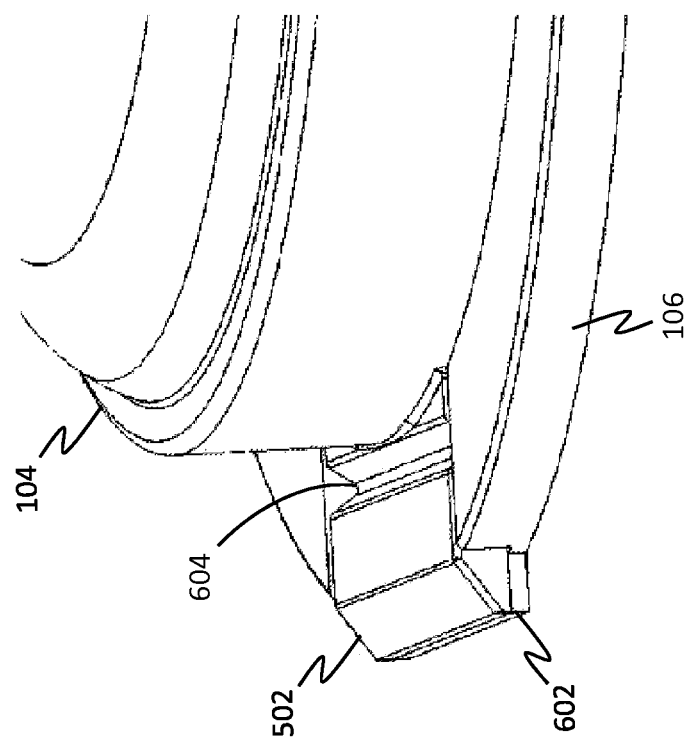
FIG. 7 is another illustration of a second detailed perspective view of the compound hinge of the food container top of FIG. 1, wherein the top is in the closed position, in accordance with one embodiment.

FIG. 5 is an illustration of a detailed perspective view of the food container top 102 of FIG. 1, wherein the top is in the closed position, FIG. 6 is an illustration of a detailed perspective view of the compound hinge 502 of the food container top 102 of FIG. 1, and FIG. 7 is another illustration of a second detailed perspective view of the compound hinge 502 of the food container top 102 of FIG. 1. FIG. 5 shows that the top 102 comprises a flip cap 104 that is hingeably connected to the frame or ring 106 via a compound hinge 502. FIG. 6 shows that the compound hinge includes two links 602, 604, each of which comprise areas of thinner amounts of the material that composes the top 102. The design of the links 603, 604 allow them to act as hinge points, and allow the remaining portions of the top 102 to rotate about them. In one embodiment, the cross sectional thickness of the link 604 is greater than the cross sectional thickness of the link 602. Note the disclosed embodiments also anticipate the use of a conventional single or solitary hinge that includes only one link between the flip cap 104 and the frame or ring 106.

Referring to FIG. 7, before the process of attaching the top 102 to the upper brim 130 of the compartment 110, the flip cap 104 is rotated about the first link 602 of the compound hinge 502 such that the flip cap 104 rests on top of the frame 106. Note that so far the link 604 remains un-rotated or stiff. Subsequently, a hermetic sealing process, such as ultrasonic welding, is applied to a circumference of the frame or ring 106 to attach the frame or ring 106 to the upper brim 130 of the compartment 110. Upon application of the hermetic sealing process to the circumference of the frame or ring 106, the link 602 is stiffened, disabled or set in place such that the flip cap 104 can no longer rotate about the first link 602. Hence the utility of the compound hinge 502 is realized. After the first link 602 is disabled, the flip cap 104 can rotate about the second link 604 of the compound hinge 502 such that the flip cap 104 can be opened and moved away from the frame 106 to expose the seal 202.

Figure 8:
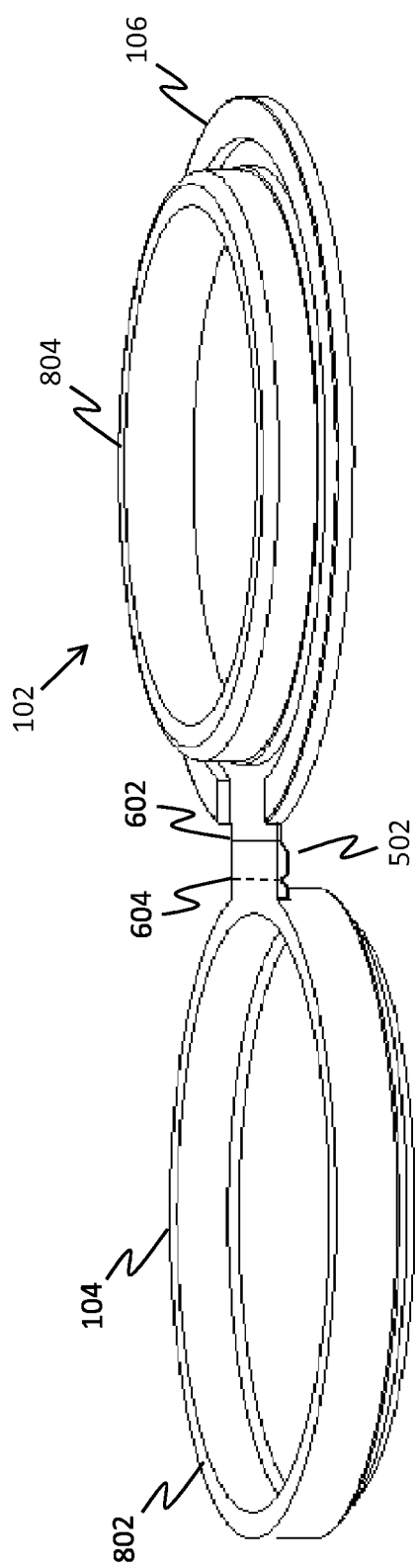
FIG. 8 is an illustration of a detailed perspective view of the food container top of FIG. 1, wherein the top is in the open position, in accordance with one embodiment.
Figure 9:
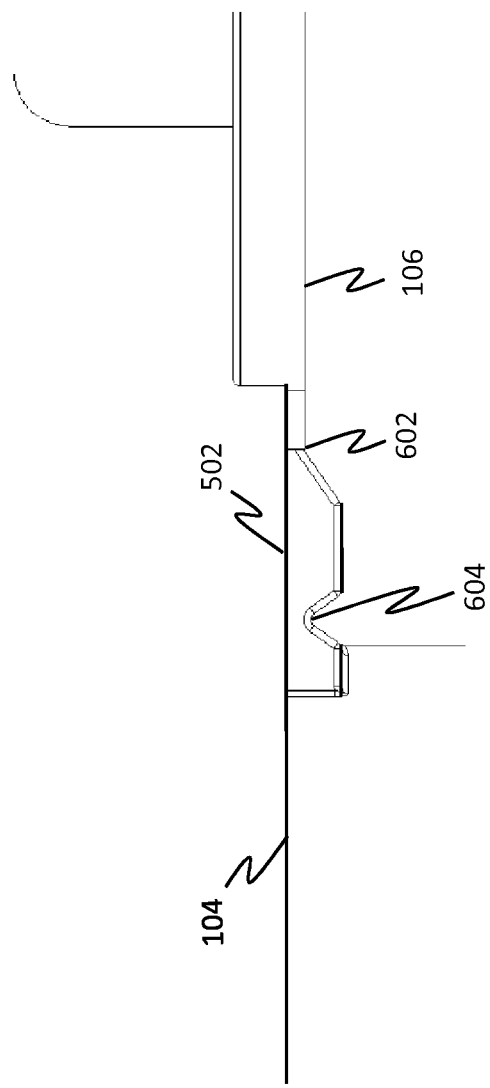
FIG. 9 is an illustration of a detailed cross sectional view of the compound hinge of the food container top of FIG. 1, wherein the top is in the open position, in accordance with one embodiment.

FIG. 8 is an illustration of a detailed perspective view of the food container top 102 of FIG. 1, wherein the top 102 is in the open position, and FIG. 9 is an illustration of a detailed cross sectional view of the compound hinge 502 of the food container top 102 of FIG. 1. FIG. 8 shows that the flip cap 104 includes a raised ring 802 that extends around a perimeter of the flip cap 104, and that the frame or ring 106 includes a raised ring 804 extending around a perimeter of the opening defined by the frame 106. The raised ring 802 is designed to fit around the raised ring 804 when the flip cap 104 is hingeably rotated about the compound hinge 502 such that the flip cap 104 rests on top of the ring 106.

Figure 10:
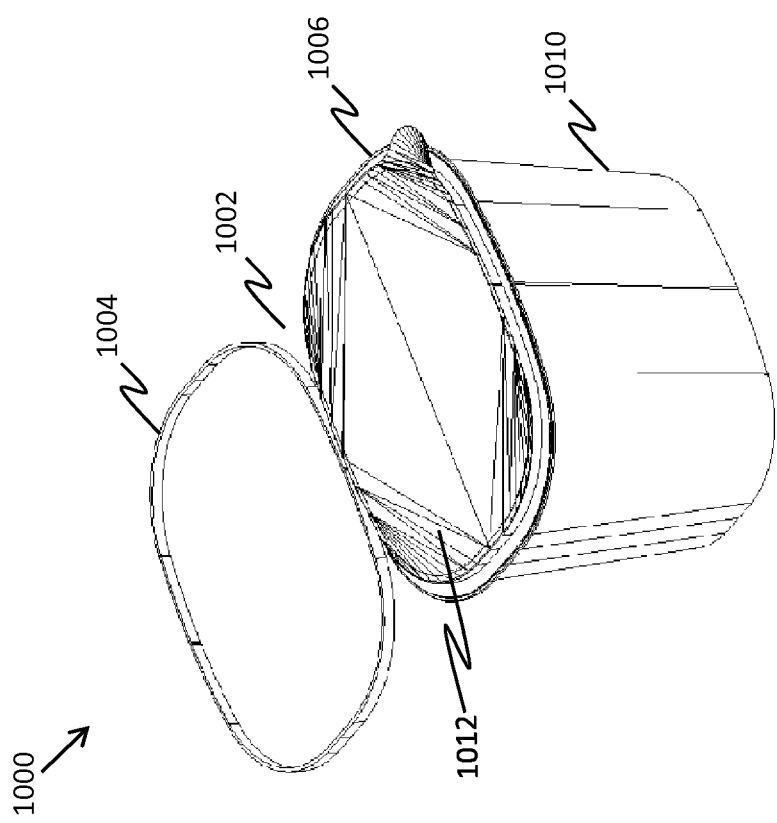
FIG. 10 is an illustration of an alternate embodiment of a large mouth food container.

FIG. 10 is an illustration of an alternate embodiment of a large mouth food container 1000. The embodiment of FIG. 10 shows that the large mouth food container 1000 includes a compartment 1010 comprising an element, such as a main housing, having a volume that holds the food included in the food container 1000. The top 1002 comprises a frame or ring 1006, and a flip cap 1004 that is hingeably connected to the ring 1006, such that the flip cap 1004 may rotate about the hinge connection to rest on top of the ring 1006, when in the closed position, or rotate about the hinge connection away from the ring 1006, when in the open position. A removable seal 1012 is applied to the opening defined by the ring 1006, so as to completely cover the opening, and hermetically seal the food contents of the compartment 1010.

Figure 11:
FIG. 11 is an illustration of a cross-sectional side view of a mold in an open state, wherein the mold is used in manufacturing the food container top of FIG. 1, in accordance with one embodiment.

FIG. 11 is an illustration of a cross-sectional side view of a mold 1102 in an open state, wherein the mold 1102 is used in manufacturing a molded article comprising the food container top 102 of FIG. 1, in accordance with one embodiment. The mold 1102 may be a positive mold, a negative mold, a mold including a core, etc. Further, the mold 1102 may support injection molding, positive phase or pressure thermoforming, and vacuum forming. FIG. 11 shows that the mold 1102 defines—in this case, using a cavity—the shape of a top 102.

The mold 1102 of FIG. 11 further supports a modified version of the in-mold labeling manufacturing process, wherein in-mold labeling is well known in the art. In-mold labeling is the use of labels during the manufacturing of containers by molding processes, such that the label serves as an integral part of the final product. FIG. 11 shows that the in-mold lidding film or seal 202 (shown in black) is placed inside of the mold 1102 and positioned adjacent or against an interior surface 1106 of the mold 1102. There are several techniques for inserting the film 202 into the mold and positioning it in the correct location within the mold during the in-mold labeling process. A vacuum may be used, as well as compressed air. Additional techniques include the use of an adhesive and static electricity.

Figure 12:
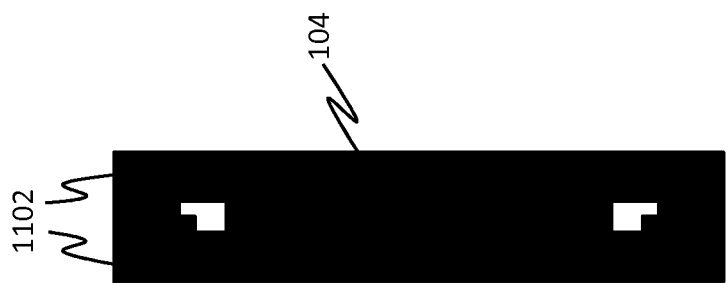
FIG. 12 is an illustration of a cross-sectional side view of the mold of FIG. 11 in a closed state, in accordance with one embodiment.

FIG. 12 is an illustration of a cross-sectional side view of the mold 1102 of FIG. 11 in a closed state, in accordance with one embodiment. While in a closed state, a heated thermoplastic resin is then injected into the cavity defined by the mold 1102. In this case, the mold 1102 defines a ring defining an opening, wherein the thermoplastic resin is not present in the opening. Note that whereas the conventional in-mold labeling process bonds an entire backing or rear of a label to the plastic product being molded, the process of the present invention modifies the in-mold labeling process by only allowing a portion of the backing or rear of a lidding film to be bonded to the plastic product. FIG. 12 further shows that the in-mold lidding film or seal 202 (shown in white) remains inside of the mold 1102 against an interior surface 1106 of the mold 1102 during the molding process.

When the molding process is complete, the edges (or the perimeter) of the film 202 are coupled to the molded article (i.e., the top 102) produced by the mold 1102, as explained in greater detail below.

Figure 13:
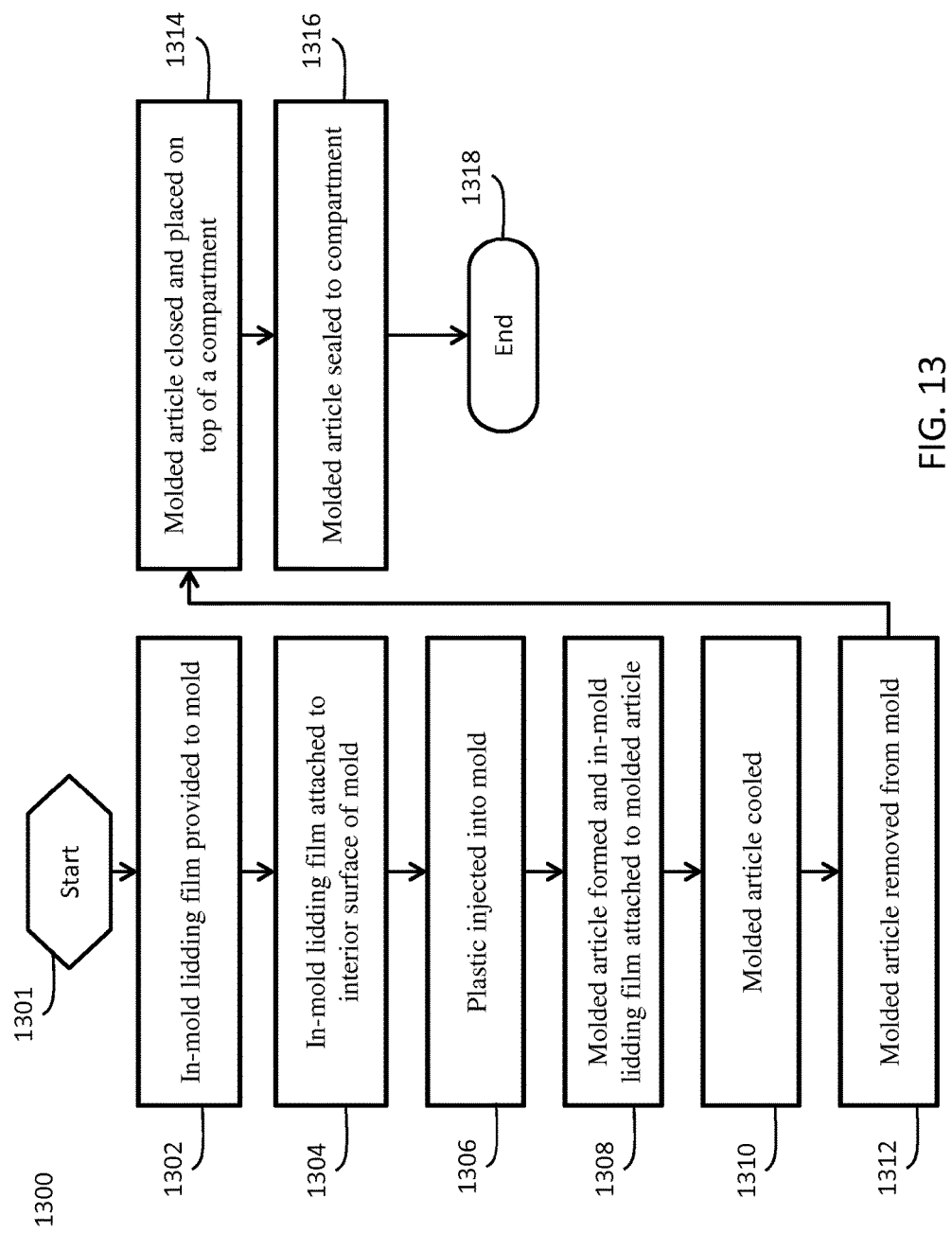
FIG. 13 is a flowchart showing the control flow of the process for manufacturing a food container including a top having a removable seal, in accordance with one embodiment.

FIG. 13 is a flowchart showing the control flow of the process 1300 for manufacturing a food container 100 including a top 102 having a seal 202, in accordance with one embodiment. The process 1300 begins in step 1301 and immediately passes to step 1302, wherein the in-mold lidding film 202 is brought into the mold 1102 and in step 1304, the film 202 is positioned adjacent or against an interior surface 1106 of the mold 1102. In step 1306, a heated thermoplastic resin is injected into the mold 1102 and in step 1308, the molded article comprising the top 102 is formed wherein the lidding film 202 is coupled to the molded article 102.

In one embodiment, the film 202 includes a heat-activatable lower surface that causes the film 202 to exhibit certain characteristics upon application of heat or of a certain amount and/or magnitude of heat, so as to improve bonding of the film 202 to the article 102 during the molding process. For example, the composition of the film 202, or of a lower surface or portion of the film 202, may be configured to change phase, exhibit adhesive properties, exhibit cohesion properties or form a bond with certain predefined other materials, when said heat is applied. In another example, the composition of the film 202, or of a lower surface or portion of the film 202, may be configured to be semi-compatible with the composition of the thermoplastic resin such that a bond is created between the film 202 and the thermoplastic resin (and/or the resulting plastic product) when said heat is applied. Said bond would be configured to hold the film 202 and the plastic product together with enough force to withstand normal shipping and handling forces related to the food container 100 but weak enough to allow the film 202 to be removed using normal finger/hand strength.

The heat-activatable material of film 202 is designed for and activated at temperatures known to those skilled in the art. Thus, the heat-activatable material is designed to activate at temperatures exhibited during the normal in-mold manufacturing process. Materials for the heat-activatable lower surface or portion of the film 202 may comprise any heat-activatable thermoplastic film material. Such materials include polyolefins, polystyrenes, polyacrylates and the like.

In yet another embodiment, the film 202 includes an adhesive (which may or may not be heat-activatable) on its lower surface that causes the film 202 to adhere to the plastic ring 106 during the molding process. Said adhesion would be configured to hold the film 202 and the plastic ring 106 together with enough force to withstand normal shipping and handling forces related to the food container 100 but weak enough to allow the film 202 to be removed using normal finger/hand strength. Materials for the heat-activatable lower surface or portion of the film 202 may comprise any heat-activatable adhesive.

In step 1308, the heated thermoplastic resin may contact a perimeter of the heat-activatable lower surface of the in-mold lidding film 202, thereby activating the heat-activatable properties of the film 202. Thus, the temperature of the heated thermoplastic resin is configured to match the heat-activatable properties of the lower surface of the in-mold lidding film 202. This causes the perimeter of the heat-activatable lower surface of the in-mold lidding film 202 to be molded to the frame or ring 106 of the molded article such that the in-mold lidding film 202 hermetically seals the opening defined by the frame or ring 106. In one embodiment, the perimeter of the lidding film 202 may refer to an outer circumference of the edges of the lidding film, or the perimeter may refer to a perimeter margin, defined as an area defined by the outer boundary of the in-mold lidding film and a boundary of substantially similar shape located to the interior of the outer boundary.

In step 1310, the molded article 102 is cooled and in step 1312 the molded article 102 is removed from the mold 1102. In step 1314, the flip cap 104 is rotated about the compound hinge 502 such that the flip cap 104 rests on top of the frame 106 and subsequently the top 102 is placed on top of the compartment 110. In step 1316, the bottom surface of the ring 106 of top 102 is hermetically sealed to a top opening (such as upper brim 130) of the compartment 110, so as to seal in the food contents of the compartment 110. In another embodiment, the step of hermetically sealing includes ultrasonically welding the bottom surface of the top 102 to a top opening (such as upper brim 130) of the compartment 110. Ultrasonic welding is an industrial technique whereby high-frequency ultrasonic acoustic vibrations are locally applied to workpieces being held together under pressure to create a solid-state weld. In ultrasonic welding, there are no connective bolts, nails, soldering materials, or adhesives necessary to bind the materials together. In yet another embodiment, the step of hermetically sealing includes the use of alternative technologies, such as laser welding, heat application, etc. In step 1318, the process 1400 ceases.

It should be noted that when the hermetic sealing process, such as ultrasonic welding, is applied to the circumference of the frame or ring 106 to attach it to the upper brim 130, the link 602 is stiffened, disabled or set in place such that the flip cap 104 can no longer rotate about the first link 602. After the first link 602 is disabled during the hermetic sealing process, however, the flip cap 104 can rotate about the second link 604 of the compound hinge 502 such that the flip cap 104 can be opened and moved away from the frame 106 to expose the seal 202.

In order to prevent the tab 204 or other portions of the seal 202 from welding onto the ring 106 during the in-mold labeling process, in one embodiment, the tab 204 or other portion of the seal 202 may be folded back prior to insertion of the seal 202 into the mold. In another embodiment, selective coating of the tab portion 204 of the seal 202 with non stick coating may be used. In another embodiment, selective non-coating of the tab portion 204 of the seal 202 may be used, wherein the sealing feature is achieved with the use of a coating. In yet another embodiment, the tab portion 204 of the seal 202 may be extended beyond the parting line of the mold, such that the tab 204 is located outside of the mold during the molding process so that it does not weld to the ring 106.

In another alternative embodiment, the top 102 is composed of a layered multi material structure to achieve a barrier to limit the migration of oxygen and moisture from transferring into or out of the container or compartment 110. An additional method for achieving an oxygen barrier is to add an oxygen scavenger to the material from which the top 102 is molded.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A molded article comprising a container top, comprising:
   a threadless frame defining an opening;
   a flip cap located substantially coplanar with, and integrally formed with, the frame;
   a hinge between the frame and the flip cap, the hinge allowing the flip cap to rotate about the hinge to rest on top of the frame;
   an in-mold lidding film having a perimeter molded to the frame, which film's edges in the thickness dimension are coupled to the frame such that the in-mold lidding film covers the opening defined by the frame, wherein the in-mold lidding film is removable from the frame; and
   a pull tab, formed from the in-mold lidding film, that extends past the opening defined by the frame.

2. The molded article of claim 1, wherein the threadless frame comprises a circular ring having an interior surface that is threadless.

3. The molded article of claim 2, wherein a compound hinge comprises two links between the circular ring and the flip cap.

4. The molded article of claim 3, wherein the in-mold lidding film comprises at least one of a metal foil, plastic, polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, fluoropolymer, polycarbonate, or mixtures thereof.

5. The molded article of claim 4, wherein the frame includes a first raised ring extending around a perimeter of the opening defined by the frame.

6. The molded article of claim 5, wherein the flip cap comprises a circular element having a second raised ring extending around a perimeter of the circular element, wherein the second raised ring is designed to fit around the first raised ring when the flip cap is hingeably rotated about the hinge.

7. The molded article of claim 1, where to the in-mold lidding film is peelable from the frame.

8. The molded article of claim 1, wherein the opening is non-circular.

9. The molded article of claim 8, wherein the opening is non-cylindrical.

10. The molded article of claim 1, wherein the in-mold lidding film forms a removable seal over the opening, and the removable seal has an upper surface which is ink-printable.

11. The molded article of claim 1, wherein the in-mold lidding film comprises an adhesive.

12. The molded article of claim 11, wherein the adhesive is heat-activatable.

13. The molded article of claim 1, wherein the pull tab may be folded in relation to the rest of the in-mold lidding film.

14. The molded article of claim 1, wherein in a closed position, a compound hinge has a height substantially equal to a height of an upper surface of the frame.

15. The molded article of claim 1, wherein the in-mold lidding film is hand-peelable from the frame.

16. The molded article of claim 1, further comprising a container, the container comprising an upper brim which defines an opening to an inner volume of the container.

17. The molded article of claim 16, wherein the frame is welded to the upper brim of the container.

18. The molded article of claim 1, further comprising a non-stick coating disposed on the pull tab to prevent coupling with the frame.

19. The molded article of claim 1, wherein the in-mold lidding film is semi-compatible with a thermoplastic resin composition of the frame.

* * * * *